(12) United States Patent
Agrawal et al.

(10) Patent No.: US 7,711,767 B2
(45) Date of Patent: *May 4, 2010

(54) SYSTEMS AND METHODS FOR STORAGE AREA NETWORK DESIGN

(75) Inventors: Dakshi Agrawal, Monsey, NY (US); Sandeep K. Gopisetty, Morgan Hill, CA (US); Kang-Won Lee, Nanuet, NY (US); Ramani R. Routray, San Jose, CA (US); Dinesh Verma, Mount Kisco, NY (US); Kaladhar Voruganti, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/135,552

(22) Filed: Jun. 9, 2008

(65) Prior Publication Data

US 2008/0275934 A1 Nov. 6, 2008

Related U.S. Application Data

(63) Continuation of application No. 10/978,056, filed on Oct. 30, 2004, now Pat. No. 7,386,585.

(51) Int. Cl.
*G06F 15/16* (2006.01)

(52) U.S. Cl. .......................................... 709/200; 716/2

(58) Field of Classification Search ......... 709/200–202, 709/223–224, 225; 716/2
See application file for complete search history.

(56) References Cited

U.S. PATENT DOCUMENTS

| | | | |
|---|---|---|---|
| 7,076,537 B2* | 7/2006 | Ward et al. .................. 709/220 |
| 7,233,983 B2* | 6/2007 | Ward et al. .................. 709/220 |
| 7,237,020 B1* | 6/2007 | Drew ......................... 709/223 |
| 7,308,494 B1* | 12/2007 | Drew et al. ................. 709/223 |
| 7,502,839 B2* | 3/2009 | O'Sullivan et al. ......... 709/220 |
| 2003/0065758 A1 | 4/2003 | O'Sullivan et al. |
| 2003/0145294 A1* | 7/2003 | Ward et al. .................... 716/5 |
| 2004/0088145 A1* | 5/2004 | Rosenthal et al. .............. 703/1 |
| 2005/0265359 A1* | 12/2005 | Drew et al. .................. 370/400 |
| 2006/0020394 A1* | 1/2006 | Dicke et al. ................... 702/19 |

\* cited by examiner

*Primary Examiner*—Moustafa M Meky
(74) *Attorney, Agent, or Firm*—Ference & Associates LLC

(57) ABSTRACT

Systems and methods for designing storage area network fabric. Preferably included are an arrangement for collecting user requirements on data flows to be supported by the fabric, an arrangement for grouping the data flows into flow groups according to at least one physical location parameter, an arrangement for designing components of fabric for the flow groups, the components being associated with at least one geographical region, and an arrangement for obtaining fabric by joining the fabric components via interconnection fabric, whereby flow groups over a plurality of geographical regions are supported.

11 Claims, 3 Drawing Sheets

SYSTEMS AND METHODS FOR STORAGE AREA NETWORK DESIGN

CROSS-REFERENCE TO RELATED APPLICATION

This application is a continuation application of U.S. patent application Ser. No. 10/978,056 filed on Oct. 30, 2004 now U.S. Pat. No. 7,386,585, the contents of which are hereby incorporated by reference in its entirety.

FIELD OF THE INVENTION

The present invention relates generally to the field of designing storage area networks (SANs), in particular designing SAN fabrics.

BACKGROUND OF THE INVENTION

A basic function of a SAN is to support the flow of data between hosts and storage devices. However, apart from flow constraints, a SAN design also needs to take into account user specified RAS (reliability, availability, and serviceability) and physical constraints such as location and size of devices and their heat dissipation. Furthermore, the fiber channel switches, host bus adapters (HBAs), and storage devices used in a SAN often have interoperability constraints that are documented by each vendor. As a result, there may be hundreds or even thousands of implicit constraints in a particular SAN design problem. For a SAN to operate smoothly, all these constraints should be taken into account by the design process.

The most popular approach to design SANs is "by hand" by experts in the field. A field practitioner would follow conservative best practices to design a SAN. An example of such conservative best practices is to use equipment built by a single vendor so that most interoperability constraints can be avoided. However, the design "by hand" often results in excessive caution leading to overprovisioning and lock-in with a particular manufacturer. On the other hand, the manual SAN design process can be further assisted by software SAN design tools (such as EMC SAN Architect), which provide simple design to human operators. For example, such tools can provide guidance on device interoperability by filtering out devices that are incompatible with the devices selected so far. However, such a tool still relies on a human operator's expert knowledge in selecting designs and coming up with the SAN configuration.

Recently, a few approaches to automate SAN design have been proposed that rely upon conventional optimization techniques and heuristics. However, conventional automated approaches ignore a part of RAS requirements since such constraints are difficult to incorporate into conventional optimization algorithms even for medium scale SAN design. It is also observed that conventional automated SAN fabric design does not have the capability of generating SAN fabric spanning across multiple geographical regions. Furthermore, none of the automated SAN fabric generation tools takes physical constraints into account when designing SAN fabric. Considering physical constraints in SAN design process may be important because such physical constraints may require grouping of certain devices separate from other devices (e.g. certain hosts must be placed in a room with security access).

Accordingly, a need has been recognized in connection with providing a SAN design that would respect all user requirements including RAS/physical constraints and design SAN without significant overprovisioning and by following best practices in the field. A need has also been recognized in connection with providing a SAN fabric design methodology that decomposes total flow requirements into multiple flow groups (e.g. based on geographic location) and generates SAN fabric for each flow group while connecting these SAN fabrics by interconnection technologies to generate a total SAN fabric that can accommodate the entire flow requirement.

SUMMARY OF THE INVENTION

There is broadly contemplated, in accordance with at least one presently preferred embodiment of the present invention, the optimization of scalable SAN fabric templates, with predefined connectivity patterns within themselves and as well as with other fabric components, individually. As discussed in detail below, the use of predefined connectivity patterns ensures that RAS constraints specified by the user are satisfied. Also using scalable templates, the SAN design can be optimized to carry a given number of flows with minimum amount of switches and other hardware used in the SAN fabric. Second, not only logical constraints (RAS requirements) but also physical requirements (such as the location of a host in a particular building floor and room) are considered herein in a SAN fabric generation process, so that the resulting SAN fabric configuration satisfies both logical and physical constraints. Thirdly, when designing a SAN fabric for a large scale SAN, the overall fabric requirements can preferably be decomposed into multiple groups (for example, based on geographic region) whereby SAN fabric is designed in accordance with each of the component requirements, whereupon these designs are interconnected to generate an entire SAN.

Due to the optimization of template size, designs contemplated herein can avoid overprovisioning often seen in manual designs. At the same time, the use of templates avoids overzealous optimizations often seen in automated designs leading to the limited scalability for future growth and the violation of RAS and physical constraints.

In summary, the invention provides an apparatus for designing storage area network fabric, said apparatus comprising: a processor; a memory storing code accessible by the processor to: collect user requirements on data flows to be supported by the fabric; group the data flows into flow groups according to at least one physical location parameter; design components of fabric for the flow groups, the components being associated with at least one geographical region; and obtain fabric by joining the fabric components via interconnection fabric, whereby flow groups over a plurality of geographical regions are supported.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
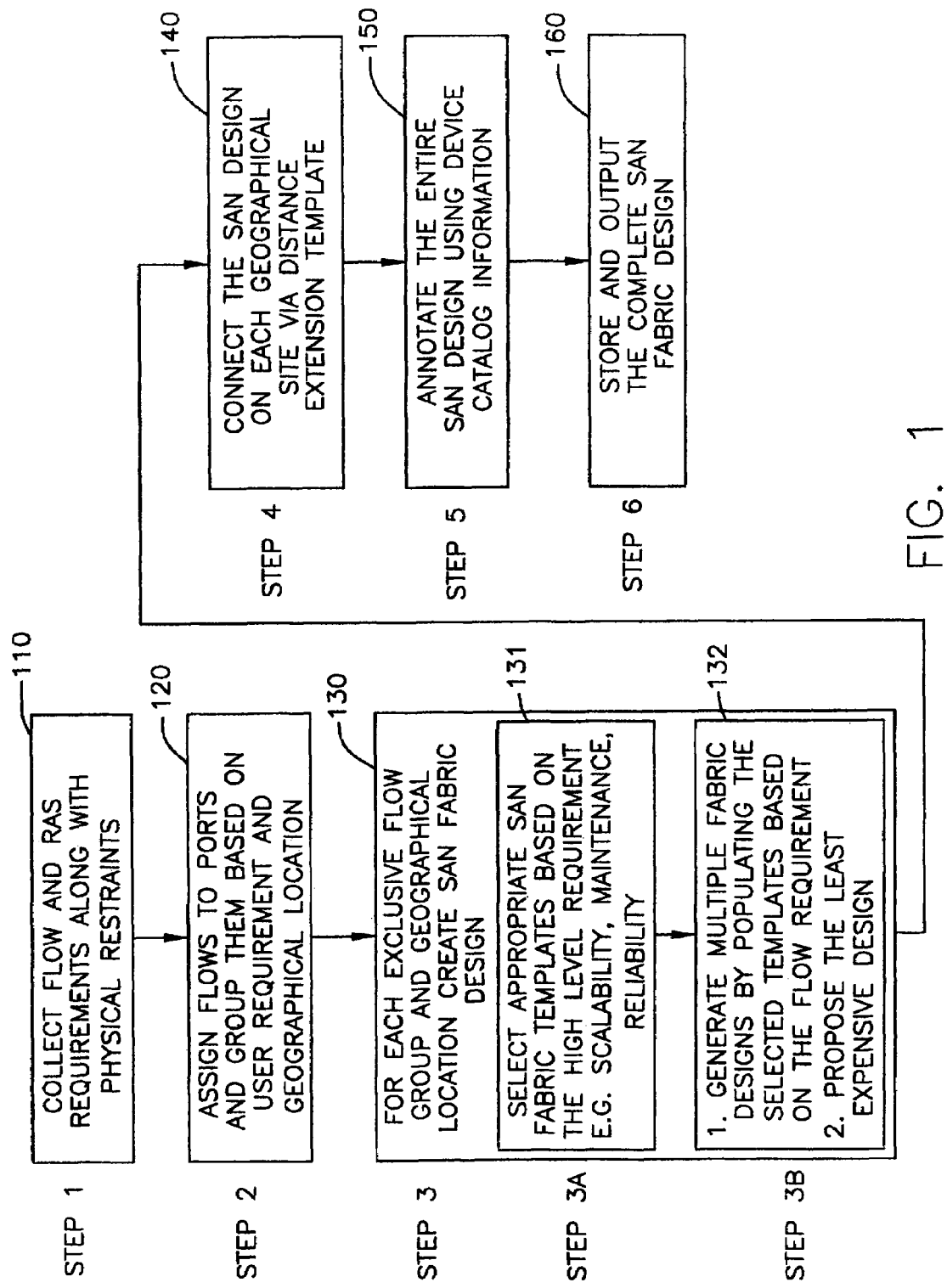
FIG. 1 presents a flow chart illustrating a general process.

Referring to FIG. 1, a SAN fabric design process in accordance with at least one embodiment of the present invention is described. Preferably, a first step of designing SAN fabric is to collect user requirements on data flows that will be supported by the SAN fabric 110. Preferably, the low level design parameters are derived from high level user requirements. For example, the user can specify application type and service level to describe the storage and networking needs that he or she has for a particular application (e.g. enterprise email server) instead of specifying the data rate and random read/write ratio. The process of collecting user requirement may include the following types of input:

high level user requirements;

preferred device and inventory information; and/or physical constraints and geographical information.

For high level user requirement gathering, one or more of the following user requirements may be collected:

Application types: This indicates for what type of application the host will use SAN fabric to access the storage. For example, the application type may be File system, On-line Transaction Processing (OLTP), Decision Support System (DSS), Mailbox, Streaming server, etc. Based on the application type, one can derive flow requirements such as data transfer size, random read/write ratio, sequential read/write ratio, etc. Also, certain applications may require a dedicated use of SAN fabric for security and performance reasons. This mapping from application type to flow requirement can be stored in a table that lists well-known application type and the corresponding low level parameters. For example, a typical OLTP database has request size of 4 KB with random read/write ratio of 3, and requires a high data rate.

Data types: This indicates the amount of data to be stored in the storage device and the reliability and the availability of the data storage. The amount of data will be determined by the actual need of the application. However, one can estimate the level of storage requirement based on the application type. For example, a typical storage size for an email application for a medium size corporate with 500 employees may require 100 GB. The reliability and the availability of storage can determine the RAID (Redundant Array of Independent Discs) level and the non-single point of failure requirement in the storage controller. Similarly, the mapping between data type and the storage parameter can be stored in a table.

Service class: Service class is used to determine the performance requirement of the SAN fabric. In general, service class can be specified in abstract terms such as "Platinum service", "Gold service", "High availability service", "Value service", etc. For each service class, a predefined SAN recipe is preferably associated with the parameters for availability, non-single-point-of-failure, Fiber Channel bandwidth, and latency, etc. In general, the availability is represented in terms of up time (e.g., five 9 availability (99.999% uptime), four 9 availability (99.99% uptime)), and to avoid single point of failure, the core of SAN fabric or the entire SAN fabric can be duplicated resulting in more expensive but much higher available SAN. This mapping from service class to configuration parameters can be stored in a table for service class to SAN design parameter translation.

Serviceability and future growth: The serviceability and future growth parameter preferably specifies answers to the following questions: When a component in the SAN is down, is it possible to replace a failed component without shutting down a switch? Does the switch have expansion slots so that more ports can be added in the future? Can a SPF be tolerated during service? What is projected future bandwidth growth on host ports? These parameters can be specified by the user or derived from the service class.

In addition to the high level requirement that specifies application and storage specific parameters, the user can optionally provide device level information such as preferred device vendors and model number (e.g. IBM F16 SAN switch). Alternatively, the user can preferably specify logical information of SAN devices in terms of device type (e.g. director class switch or edge switch) or capability (e.g. 16-port switch with 2 Gbps port speed). Additionally, there can preferably be provided for the collection of physical characteristics of SAN devices such as size of the device, power consumption, heat dissipation, and operational temperature. Such information is generally available from the vendor. Also, the user can specify device types from the inventory list of readily available devices. Thence, the SAN fabric configuration generation step 130 will preferably generate a SAN fabric design that can utilize those device requirements. Finally, one can preferably obtain device interoperability matrices from the vendor, which contains a comprehensive list of all the devices that are known to work well with the particular SAN product. In the annotation step 150, these device interoperability constraints are used to connect devices that are compatible. It is noted that the inventory information and the device interoperability information do not necessarily come from the user. Instead, they may be stored in local storage device or may be accessed via Internet or intranet so that they can be read and processed when the SAN design tool needs them.

Finally, the first step may involve the collection of physical constraints and geographical information relating to the site for which the SAN fabric is designed. The physical constraints specify physical characteristic of the site that has not been captured in other user requirements. For example, the floor plan of a building where the hosts and storage servers are placed or will be located has an implication on the fabric design because it is logical to wire the hosts on the same floor first before connecting them with hosts on the other floors. Also, geographically distributed locations may need to be connected via interconnection technologies that allow remote data copy between two storage devices. Remote data copy is also highly desirable for data backup and for the restoration and recovery of a site from disaster. Another example may come from the fact that certain hosts may require security at physical access level. In that case, all such hosts should preferably be placed in a secure room with access control where only people with proper clearance can enter. Since these requirement places physical constraints on the SAN fabric connection it is important to consider these constraint.

Some of the methods for collecting these requirements and constraints are, but not limited to, as follows: using a graphical user interface to interview the user and collect user preferences and constraints, a mining analysis of existing storage data, and a best practices assessment of user requirements based on the nature of application.

In the second step 120, the requirements collected in the first step 110 are preferably processed to group flows and assign flows in a group to ports on host devices and storage devices. For each application on each host, a corresponding logical flow is created and is assigned to ports. Then these logical flows are assigned to the storage ports based on their target storage requirement. The process of allocating of flows to storage devices can be done via conventional arrangements. As a result of storage assignment, the logical flows from the same host and the logical flows of the same type of applications may be allocated to the same storage. After the port assignment is done, the flows are preferably grouped based on the origin and the destination of the flows. In particular, the logical flows with the same origin and destination are grouped into a single flow group. In this way, the flows that are local to a region are grouped together, and also the flows that span across two particular sites are grouped together. Note that the scope of origin and destination can be defined by location (e.g. geographical region, address) or logical structure (e.g. organization, business unit). Also, the flows may be grouped in such a way that flow groups do not share SAN fabric. For example, certain flows should not share fabric with each other since they use different networking protocol. In another example, certain servers may require dedicated fabric because they host high quality video streaming application and certain level of bandwidth guarantee is required from the network. In such cases flow groups form exclusive groups because they cannot share fabric.

In addition, the flows may be further subdivided into flow subgroups that share the same end node, wherein the end node is either hub or switch. This grouping of flows may be based on security group and availability constraints. For example, as described in the first step, the flows from the hosts that must be placed in a secure room may need to be grouped together.

Figure 2:
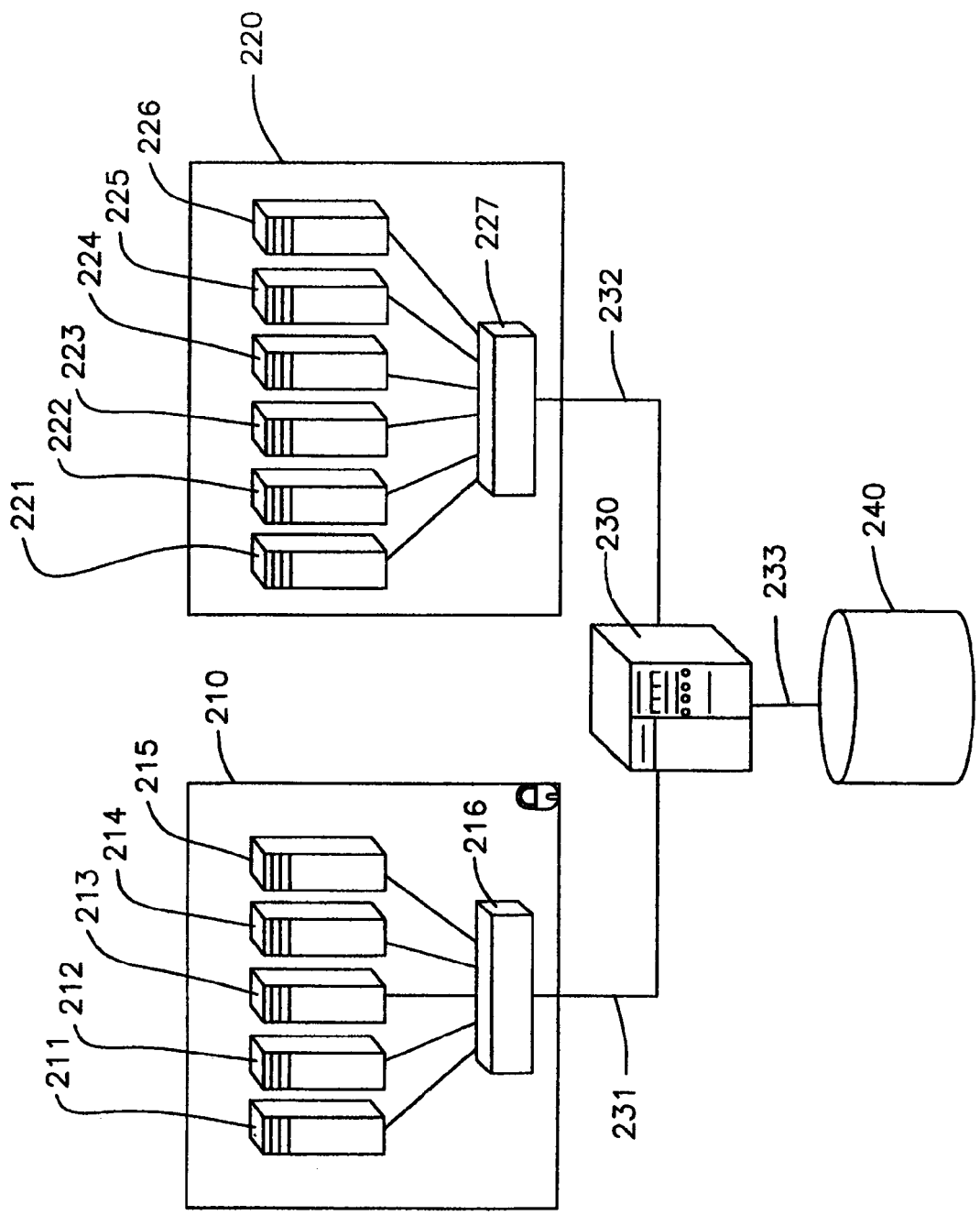
FIG. 2 illustrates an example where certain hosts are placed in a secure room.

FIG. 2 illustrates such an example. As shown, there are two rooms 210 and 220, where 210 is a secure room that requires clearance for access and 220 is not. Likewise, hosts 211-215 require physical access level security whereas hosts 221-226 may be placed in a room without special access control. Thus the hosts 211-215 are placed in the secure room 210 and connected to an end device 216, which is an edge switch in the same room via fiber cables 217. Similarly the hosts 221-226 are placed in the room 220 without access control and are connected to an end device 227 via fiber cables 228. The edge switches 216 and 227 are connected a core switch 230 via fiber cables 231 and 232. The core switch 230 is also connected to the storage device 240 via fiber cable 233.

The case may then be contemplated of the physical constraint (room level security) not being considered when generating SAN fabric design. Then it is possible to generate a SAN fabric configuration, in which hosts 211 and 221 are connected to the same end device and host 212 and 223 are connected to the same end device. In other words, designing a SAN without the knowledge of physical constraints may generate an infeasible or more inefficient SAN fabric design. Consequently, it is important to consider physical constraints during the SAN fabric generation. In addition to the security level, the present invention may group flows based on other metrics such as service class and availability requirements of each flow. For example, a flow that cannot have a SPF should have at least two disjoint fabric paths from two ports on two different HBAs on a host to two different ports on two different controllers on a storage device. All these requirements should preferably be honored during the SAN fabric generation step.

Figure 3:
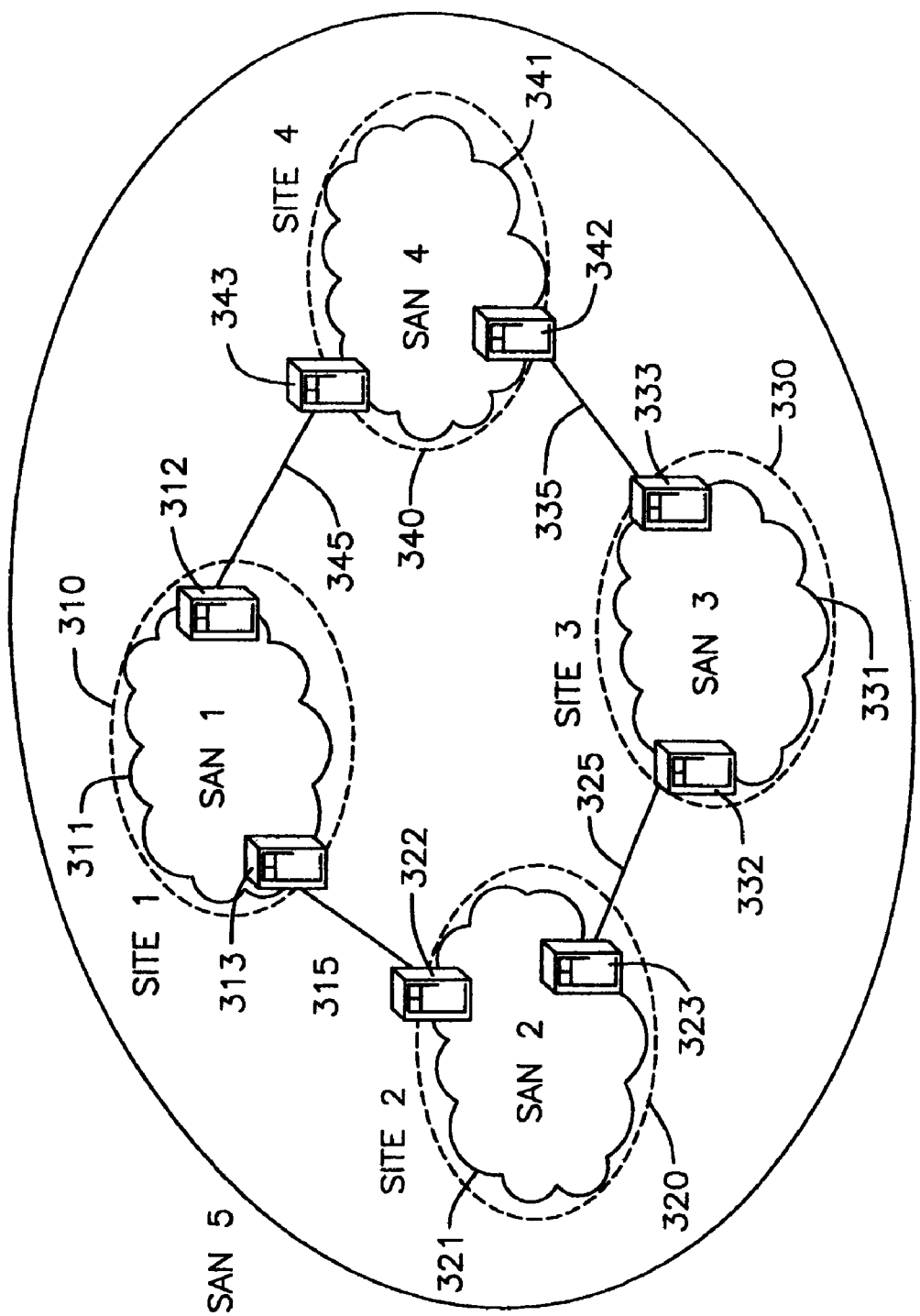
FIG. 3 illustrates an example where multiple SAN fabrics are designed and interconnected to generate a large SAN.

In the third step 130, the SAN fabric generation process is preferably performed for each flow group. In other words, SAN fabric is designed for each region, and in each region, separate SAN fabrics are designed for each exclusive flow group. Referring to FIG. 3, the SAN design process is illustrated by decomposition. In the figure, the customer has four sites: Site 1 310, Site 2 320, Site 3 330, and Site 4 340. For each site, SAN fabric is designed. For example, for Site 1 310, SAN 1 311 is designed with all the user requirements, device level information, and physical constraints defined for flows in the site 1. Likewise, SAN 2 321 is designed for site 2 320, SAN 3 331 is designed for site 3 330, and SAN 4 341 is designed for site 4 340.

By decomposing the original SAN design problem into multiple smaller problems, the complexity of SAN design becomes reduced. In this way, a presently contemplated SAN fabric design algorithm can scale to meet the design requirements of a large scale SAN that spans across many geographically distributed regions. To define a flow group for a site, one should preferably collect all the flows that start and end in the site, the flows that start from the site but do not end in the site, and the flows that do not start in the site but do end in the site. For example, to design a SAN fabric for site 1 310, the flow group must include all the flows that are within, originated from, and terminate in site 1 310. In this way, the total flow requirement of a site can be accurately determined.

To generate a SAN fabric for a site, first a scalable template is selected from a catalogue of such templates that satisfies the RAS requirement from the user that has been previously collected. Examples of SAN fabric templates include: core-only template, core-only template with redundancy, core-edge template, core-edge template with redundancy, co-located storage template, and co-located template with redundancy. SAN design templates have certain precompiled RAS/physical properties and they can be populated and resized to offer transport for different number flows. For example, the core-edge template has an excellent scalability property by adding more switches when more devices need to be connected. On the other hand, the co-located template is good for cases when there is strong affinity between certain hosts and storage devices. Similarly, applications that require no single point of failure in the fabric should choose a template with redundant fabric.

In order to choose templates, first, exclusive flow groups are preferably identified and processed separately since they should preferably not share SAN fabrics with each other. For each flow group, one or more SAN design templates that satisfy RAS and physical constraint of the group are chosen. Once a template has been selected based the high level requirement, the size of the template and the types of switches to be used in the template must be determined based on the flow requirements and device level requirement 132.

The process of populating a design template preferably includes optimizations to reduce the number of switches and the number of ports on the switch and other hardware used in the fabric while keeping the RAS/physical characteristic of the template intact. This process also preferably involves selecting only the types of the devices that the user has specified in the first step 110. Due to the variety in device choices and multiple different ways of assigning flows to the template, this process may generate multiple SAN fabric design. It is presently envisioned that this process may actually generate multiple SAN fabric for each site and let the human operator select the SAN fabric design. In this case, one can return the least expensive design first and then return the next least expensive designs in that order.

Once a SAN fabric template has been selected, templates are preferably populated by using optimization techniques so that each populated template can carry all the flows in the group 132. The optimization technique minimizes the number of switches and other hardware used in the fabric while keeping the RAS/physical characteristic of the template intact. When the catalog information is available the optimization algorithm operates based on the averaged cost of each type of device. When the exact cost information is not available at design time, which is the common case for SAN fabric switches, the algorithm follows a simple rule of thumb, for example, that the cost of SAN switches grows at a super-linearly as the number of ports increases. After the templates have been populated, their cost is computed by taking into consideration of the expected cost of the new switches and the depreciated value of available hardware, and the resulting least expensive populated template is flagged as the designated fiber for that group. Alternatively, multiple templates (that are possible for the given user/application requirement) can be provided in the order where least expensive design is presented first and subsequently more expensive design choices are presented.

When assigning flows to the template, all localized flows that originate and terminate within the SAN fabric region get assigned to host side fabric ports and storage side fabric ports. Similarly all egress flows that originate in the SAN fabric region but terminates in some other SAN fabric region get assigned host side fabric ports of the template and inter-site switch fabric ports of the template, and all ingress flows that originate in some other SAN fabric region but terminates in this SAN fabric region get assigned inter-site switch fabric ports of the template and storage side fabric ports of the template. For example, in FIG. 3, flows that originate from a host in site 1 310 and end at a storage in site 1 310 are assigned host side and storage side ports of a SAN fabric template for SAN 1 311. On the other hand, flows that originate from a host in site 1 310 and end at a storage in site 2 320 are assigned host side ports of a SAN fabric template for SAN1 311 and inter-site switch ports at the switch 313.

In the fourth step 140, SAN fabric designs that have been computed for each geographical location are interconnected using predefined distance connectivity patterns. For example, the interconnection technology for site 1 310 and site 2 320 in FIG. 3 may require data transmission over DWDM (dense wavelength division multiplexing) due to the physical distance and the traffic pattern between them. It should be noted that different sites may require different interconnection technology. For example, site 1 310 and site 3 330 in FIG. 3 may be connected via FC channel extender without requiring DWDM switching. In addition, the present invention will assist the human operation in selecting the appropriate network protocol, e.g. Fiber Channel, Gigabit Ethernet, SONET, ATM, FICON, ESCON, and various data copy solutions, e.g. PPRC (peer-to-peer remote copy) or XRC (extended remote copy). For selecting distance connection options, the proposed invention also provides templates with various characteristics. Thus the user can select a predefined connectivity pattern that can ensure that none of the RAS constraints is violated by the combined SAN fabric 350.

In the fifth step 150, a device catalogue is looked up for available switches that match requirements (port count, link speed, reliability etc) of the devices listed in the SAN fabric obtained from the fourth step. In this stage, the raw abstract design from fourth step is filled up by the details of the specific device level information such as manufacturer name, model number, and availability. Optionally the operator can choose to use the SAN devices that are already available in the inventory. When selecting devices, the interoperability constraints of the SAN switches with the host machine type and the storage type are considered so that only the devices that are known to work with each other are selected. Once specific devices are selected for the abstract SAN design, each device gets annotated with detailed catalog information. In addition, configuration information of the abstract design gets mapped to the actual device instance. For example, ports can be labeled as free, service, or bound to fabric etc., based on their role in the fabric.

In the sixth stage 160, a final configuration is written out in a standard format. In this step, the cost of the SAN fabric is computed by assigning a cost to procure each device used in the SAN fabric and summing them up. When computing the cost, the SAN fabric design too may consider the probable downtime of each device. The final configuration includes information about fabric nodes (which switches and other devices make up the SAN fabric), fabric topology (how switches and devices are connected to each other), fabric configuration (which links are trunked, which ports are zoned). An optional check on the configuration is performed to make sure the final configuration satisfies all user requirements.

It is to be understood that the present invention, in accordance with at least one presently preferred embodiment, includes an arrangement for collecting user requirements on data flows to be supported by fabric, an arrangement for grouping said data flows into flow groups, an arrangement for designing components of fabric for said flow groups, and an arrangement for obtaining fabric by joining fabric components via interconnection fabric. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for designing storage area network fabric, said apparatus comprising:
   a processor;
   a memory storing code accessible by the processor to
   collect user requirements on data flows to be supported by said fabric;
   group said data flows into flow groups according to at least one physical location parameter;
   design components of fabric for said flow groups, said components being associated with at least one geographical region; and
   obtain fabric by joining said fabric components via interconnection fabric, whereby flow groups over a plurality of geographical regions are supported.

2. The apparatus according to claim 1, wherein the at least one physical location parameter comprises at least one of: an origin and a destination.

3. The apparatus according to claim 2, wherein said memory storing code to collect user requirements is adapted to collect device information and is further adapted to:

collect logical device information, said logical device information comprising at least one of: device type and device capabilities;

collect device product information, said device product information comprising at least one of: manufacturer and model number;

collect device physical characteristics comprising at least one of: size, power consumption, heat dissipation, and operational temperature;

obtain an inventory list of available devices; and obtain at least one device interoperability matrix.

4. The apparatus according to claim 1, further comprising memory storing code to annotate said fabric with specific device information.

5. The apparatus according to claim 1, further comprising memory storing code to compute a cost of said fabric.

6. The apparatus according to claim 1, wherein said memory storing code to collect user requirements is further adapted to perform at least one of:

collecting high level user requirements;

collecting device information; and collecting physical constraints for fabric design.

7. The apparatus according to claim 6, wherein said memory storing code to collect user requirements is adapted to collect high level user requirements, and is further adapted to:

collect high level requirements from at least one of: application types, data types, service classes, and security levels; and utilize said high level requirements, estimating low level requirements for at least one of: data flows, storage, fabric, and security using said high level requirements.

8. The apparatus according to claim 6, wherein said memory storing code to collect user requirements is adapted to collect physical constraints and is further adapted to:

collect geographical location information relating to a target site;

collect floor plan and room location information of at least one host; and collect secure access information relating to at least one of: at least one room and at least one floor.

9. The apparatus according to claim 1, wherein said memory storing code to group data flows into flow groups is adapted to:

group data flows having a similar origin and destination into a single flow group; and further subdivide the single flow group into flow subgroups corresponding to data flows that share the same end node.

10. The apparatus according to claim 1, wherein said memory storing code to design components for fabric is adapted to iterate over flow groups defined by geographical region and, for each flow group, calculate a fabric that satisfies at least one of: data flow requirements, fabric requirements, device requirements, and physical constraints.

11. The apparatus according to claim 1, wherein said memory storing code to obtain fabric is adapted to:

choose a flow subgroup that spans two geographical regions;

choose a scalable distant connection template for said flow subgroup and customizing said distant connection template said flow subgroup by trying out different interconnection devices; and assign said flow subgroup to said distant connection template by allocating flows in said flow subgroup to ports of interconnection devices.

* * * * *